United States Patent
Izumikawa et al.

(10) Patent No.: US 8,244,430 B2
(45) Date of Patent: Aug. 14, 2012

(54) STROKE SENSOR ABNORMALITY DETERMINING DEVICE AND DETERMINING METHOD, AND BRAKE CONTROL DEVICE AND METHOD

(75) Inventors: Iwao Izumikawa, Toyota (JP); Tetsuya Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 387 days.

(21) Appl. No.: 12/597,921

(22) PCT Filed: Jul. 4, 2008

(86) PCT No.: PCT/IB2008/001763
§ 371 (c)(1),
(2), (4) Date: Oct. 28, 2009

(87) PCT Pub. No.: WO2009/004474
PCT Pub. Date: Jan. 8, 2009

(65) Prior Publication Data
US 2010/0131151 A1  May 27, 2010

(30) Foreign Application Priority Data
Jul. 5, 2007 (JP) .................................. 2007-177833

(51) Int. Cl.
*B60T 17/22* (2006.01)
*G06F 19/00* (2006.01)

(52) U.S. Cl. ......................... 701/34.4; 701/29.7; 303/15

(58) Field of Classification Search ................. 701/34.4, 701/29.7, 70, 121; 303/152, 15, 20, 113.4, 303/114.1, 119.1; 74/512
See application file for complete search history.

(56) References Cited

U.S. PATENT DOCUMENTS

| | | | | |
|---|---|---|---|---|
| 5,395,164 | A * | 3/1995 | Sulzyc | 303/15 |
| 5,887,954 | A * | 3/1999 | Steiner et al. | 303/113.4 |
| 6,234,588 | B1 * | 5/2001 | Sawada | 303/119.1 |
| 6,412,882 | B1 * | 7/2002 | Isono et al. | 303/114.1 |
| 2009/0033144 | A1 * | 2/2009 | Ikeda | 303/20 |
| 2010/0131151 | A1 * | 5/2010 | Izumikawa et al. | 701/34 |

FOREIGN PATENT DOCUMENTS

| | | |
|---|---|---|
| DE | 112008001750.6 | 5/2012 |
| JP | 11-260606 A | 9/1999 |
| JP | 11 301463 | 11/1999 |
| JP | 2000-136736 | 5/2000 |
| JP | 2000-249577 A | 9/2000 |
| JP | 2005 343186 | 12/2005 |

* cited by examiner

*Primary Examiner* — Tan Q Nguyen
(74) *Attorney, Agent, or Firm* — Oblon, Spivak, McClelland, Maier & Neustadt, L.L.P.

(57) ABSTRACT

In a stroke sensor abnormality determining device, a stroke sensor detects the stroke of a brake pedal by detecting a voltage that varies in accordance with the stroke of the brake pedal. An abnormality determining section determines whether an abnormality has occurred in the stroke sensor on the basis of the voltage detected by the stroke sensor. A pedal position determining section determines whether the brake pedal is positioned near a stroke start end. If it is determined that the brake pedal is positioned near the stroke start end, the abnormality determining section does not determine that an abnormality has occurred in the stroke sensor.

14 Claims, 6 Drawing Sheets

STROKE SENSOR ABNORMALITY DETERMINING DEVICE AND DETERMINING METHOD, AND BRAKE CONTROL DEVICE AND METHOD

FIELD OF THE INVENTION

The present invention relates to stroke sensor abnormality determination and brake control. More specifically, the present invention relates to a technique related to stroke sensor abnormality determination for determining whether an abnormality has occurred in a stroke sensor that detects the stroke of a brake pedal, and brake control.

BACKGROUND OF THE INVENTION

The stroke of a brake pedal in a vehicle is normally computed on the basis of the detection result of a stroke sensor or master cylinder pressure sensor. A braking force control device provided in the vehicle controls the wheel cylinder pressure so that braking force is applied to the vehicle in accordance with the computed stroke, thereby applying appropriate braking force to the vehicle. With regard to abnormality determination in this brake control device, for example, there has been proposed an abnormality determining device in which an open/close valve is opened when the detection value of a stroke sensor is less than a reference value of a master cylinder pressure sensor, and the detection value of the master cylinder pressure sensor and the detection value of a wheel cylinder pressure sensor are compared against each other, and it is determined whether the master cylinder sensor is abnormal or the stroke of the brake pedal sensor is abnormal (see, for example, Japanese Patent Application Publication No. 11-301463 (JP-A-11-301463)).

A braking force control with an electromagnetic valve or the like in a vehicle is carried out by using the stroke of a brake pedal detected by a stroke sensor. Thus, for example, if it is determined that the stroke sensor is abnormal, it is necessary to take a countermeasure such as canceling the braking force control and transmitting the master cylinder pressure to a wheel cylinder as it is. However, such switching of braking force control may impair the brake feeling for the driver since it affects the depression force on the brake pedal.

SUMMARY OF THE INVENTION

The present invention prevents the brake feeling for the driver from decreasing by making a stroke sensor abnormality determination.

A stroke sensor abnormality determining device according to an aspect of the present invention includes: a stroke sensor that detects a stroke of a brake pedal by detecting an electrical characteristic that varies in accordance with a stroke of the brake pedal; abnormality determining means for determining whether an abnormality has occurred in the stroke sensor on the basis of the electrical characteristic detected by the stroke sensor; and pedal position determining means for determining whether the brake pedal is positioned near a stroke end of the brake pedal. The abnormality determining means does not determine that an abnormality has occurred in the stroke sensor, if it is determined that the brake pedal is positioned near a stroke end.

In the case of a sliding type stroke sensor, for example, a brush slides on a resistor. Thus, in some cases, abrasion dust of the brush or resistor accumulates between the brush and the resistor. It is possible that this abrasion dust affects the relationship between the stroke of the brake pedal and the detected voltage value, impairing appropriate abnormality determination for the stroke sensor. In such a sliding type stroke sensor, abrasion dust tends to accumulate and affect the abnormality determination for the stroke sensor when the brake pedal is positioned at, a stroke start end that is the position of the brake pedal when not depressed, and a stroke finish end that is the position of the brake pedal when depressed to the maximum stroke. According to this aspect, when the brake pedal is at the position of a stroke end where the abnormality determination for the stroke sensor tends to be affected, it is not determined that an abnormality has occurred in the stroke sensor. It is thus possible to reduce the frequency with which it is determined that an abnormality has occurred in the stroke sensor. Therefore, it is possible to reduce the frequency with which brake control is cancelled due to an abnormality in the stroke sensor, thereby preventing a decrease in brake feeling for the driver.

The pedal position determining means determines whether the brake pedal is positioned near a stroke start end at which the brake pedal is positioned when not depressed, and if it is determined that the brake pedal is positioned near the stroke start end, the abnormality determining means does not determine that an abnormality has occurred in the stroke sensor.

In general, the brake pedal is more frequently positioned at the stroke start end than at the stroke finish end. Therefore, in the case of a sliding type stroke sensor, for example, abrasion dust tends to accumulate more easily at the position of the brush when the brake pedal is positioned at the stroke start end than that when the brake pedal is positioned at the stroke finish end. Further, at the time when the brake pedal is positioned at the stroke start end, the brake pedal has not been depressed, and application of braking force is not requested. Thus, there is little need to carry out abnormality determination for the stroke sensor. According to this aspect, when the brake pedal is at the stroke start end, it is not determined that an abnormality has occurred in the stroke sensor, thereby making it possible to easily and effectively reduce the frequency with which it is determined that an abnormality has occurred in the stroke sensor.

The stroke sensor abnormality determining device may further include master cylinder pressure detecting means for detecting a master cylinder pressure. The pedal position determining means may determine whether the brake pedal is positioned near a stroke end by using the detected master cylinder pressure.

For example, if abrasion dust accumulates at the position of the brush at the time when the brake pedal is positioned at a stroke end, the detection result of the stroke sensor may be affected by abrasion dust. According to this aspect, the master cylinder pressure is used to determine whether the brake pedal is positioned near a stroke end, thereby making it possible to prevent use of the detection result of the stroke sensor which may have been affected by abrasion dust. Therefore, it is possible to determine whether the brake pedal is positioned near a stroke end in an accurate and stable manner.

The pedal position determining means may determine whether the brake pedal is positioned near a stroke end on the basis of the electrical characteristic detected by the stroke sensor.

The master cylinder pressure does not greatly vary when, for example, the brake pedal is positioned near the stroke start end, and begins to vary greatly after the brake pedal has been turned somewhat from the stroke start end. In contrast, the electrical characteristic detected by the stroke sensor varies stably in accordance with the stroke even at a position near a stroke end. According to this aspect, whether the brake pedal is positioned near a stroke end is determined on the basis of the electrical characteristic detected by the stroke sensor in this way. Thus, when the brake pedal is located near the stroke start end, the position of the brake pedal can be accurately grasped. Therefore, the abnormality determination for the stroke sensor can be carried out over a broader range, thereby making it possible to carry out appropriate control in accordance with whether the stroke sensor is normal or abnormal.

The stroke sensor may detect a first voltage that increases as a stroke of the brake pedal increases, and the pedal position determining means may determine that the brake pedal is positioned near a stroke end, if a stroke computed by using the first voltage detected by the stroke sensor is smaller than a predetermined value.

When detecting a stroke by detecting a voltage, in the case of, for example, a sliding type stroke sensor, the detected voltage may drop due to accumulation of abrasion dust. In this regard, for example, when detecting a voltage that decreases as the stroke of the brake pedal increases, if the detected voltage drops due to accumulation of abrasion dust, there is a possibility that this may be regarded as indicating an increase in the stroke of the brake pedal, so an abnormality determination is carried out even through the actual value of the stroke is such that an abnormality determination for the stroke sensor should be canceled. Accordingly, by using the first voltage that increases as the stroke of the brake pedal increases to thereby compute a stroke at which an abnormality determination for the stroke sensor should be canceled as described above, it is possible to appropriately cancel the abnormality determination for the stroke sensor.

The stroke sensor may detect a second voltage that decreases as a stroke of the brake pedal increases. According to this aspect, the stroke of the brake pedal can be computed by using either the first voltage or the second voltage. Therefore, the stroke of the brake pedal can be properly detected even when a problem has occurred in the detection of one of these voltages.

A second aspect of the present invention relates to a brake control device. This brake control device includes: a stroke sensor that detects a stroke of a brake pedal by detecting an electrical characteristic that varies in accordance with a stroke of the brake pedal; pedal position determining means for determining whether the brake pedal is positioned near a stroke end of the brake pedal; and control means for carrying out abnormal-condition brake control when an abnormality has occurred in the stroke sensor. The control means does not carry out the abnormal-condition brake control if it is determined that the brake pedal is positioned near a stroke end.

A third aspect of the present invention relates to a stroke sensor abnormality determining method. This determination method includes the steps of: detecting an electrical characteristic that varies in accordance with a stroke of a brake pedal; determining whether an abnormality has occurred in the stroke sensor on the basis of the detected electrical characteristic; and determining whether a brake pedal is positioned near a stroke end of the brake pedal. In this determination method, if it is determined that the brake pedal is positioned near a stroke end, it is not determined that an abnormality has occurred in the stroke sensor.

A fourth aspect of the present invention relates to a brake control method including the steps of: detecting an electrical characteristic that varies in accordance with a stroke of a brake pedal; determining whether an abnormality has occurred in the stroke sensor on the basis of the detected electrical characteristic; and determining whether a brake pedal is positioned near a stroke end of the brake pedal. In this brake control method, even if it has been determined that an abnormality has occurred in the stroke sensor, when it is determined that the brake pedal is positioned near a stroke end of the brake pedal, abnormal-condition brake control is not carried out.

According to the present invention, it is possible to prevent the brake feeling for the driver from decreasing by making a stroke sensor abnormality determination.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

First Embodiment

Figure 1:
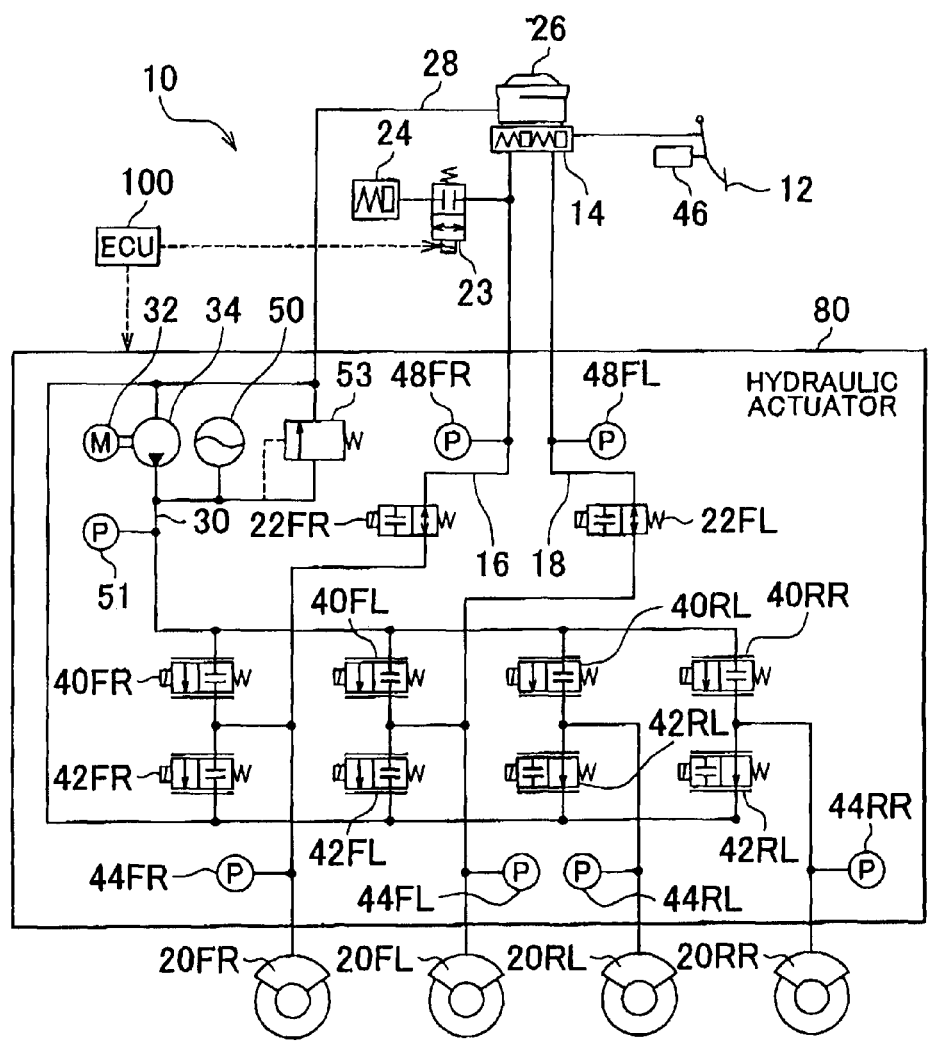
FIG. 1 is a system diagram of a brake control device according to a first embodiment of the present invention.

FIG. 1 is a system diagram of a brake control device 10 according to a first embodiment of the present invention. The brake control device 10 employs an electronically controlled brake system (ECB), which sets the braking force on four wheels of a vehicle independently in an optimal fashion in accordance with an operation on a brake pedal 12 as a brake operation member operated by the driver.

The brake pedal 12 is connected to a master cylinder 14 that supplies brake fluid as a hydraulic fluid in accordance with a driver's depression of the brake pedal 12. The brake pedal 12 is provided with a stroke sensor 46 that detects the stroke of the depression. Further, a reservoir tank 26 is connected to the master cylinder 14, and a stroke simulator 24 that generates a reaction force corresponding to an operating force applied to the brake pedal 12 by the driver is connected to one output port of the master cylinder 14 via an electromagnetic valve 23. The electromagnetic valve 23 is a so-called normally closed linear valve, which is closed when supplied with no electric current, and opens when supplied with electric current upon detection of a depression of the brake pedal 12 by the driver.

A brake fluid pressure control pipe 16 for a right front wheel is connected to the one output port of the master cylinder 14. The brake fluid pressure control pipe 16 is connected to a right-front-wheel cylinder 20FR that applies braking force to a right front wheel. A brake fluid pressure control pipe 18 for a left front wheel is connected to the other output port of the master cylinder 14. The brake fluid pressure control pipe 18 is connected to a left-front-wheel cylinder 20FL that applies braking force to a left front wheel.

A right master valve 22FR is interposed in the brake fluid pressure control pipe 16, and a left master valve 22FL is interposed in the brake fluid pressure control pipe 18. The right master valve 22FR and the left master valve 22FL are each a so-called normally open linear valve, which is closed when supplied with electric current so as to prevent communication between the master cylinder 14 and the right-front-wheel cylinder 20FR or the left-front-wheel cylinder 20FL, and which opens when supply of electric current is reduced or stopped so as to bring the master cylinder 14 and the right-front-wheel cylinder 20FR or the left-front-wheel cylinder 20FL into communication with each other. Hereinafter, the right master valve 22FR and the left master valve 22FL are generically referred to as master valves 22 as required.

A right master pressure sensor 48FR that detects the master cylinder pressure on the right front wheel side is interposed in the brake fluid pressure control pipe 16. A left master pressure sensor 48FL that detects the master cylinder pressure on the left front wheel side is interposed in the brake fluid pressure control pipe 18. In the brake control device 10, when the brake pedal 12 is depressed by the driver, the amount of the depression is detected by the stroke sensor 46. In this regard, the depression force (leg power) on the brake pedal 12 can be also obtained from a master cylinder pressure detected by each of the right master pressure sensor 48FR and the left master pressure sensor 48FL. Considering the possibility of failure of the stroke sensor 46 or the like, from the fail-safe viewpoint, an electronically controlled unit (hereinafter, referred to as the "ECU") 100 monitors the master cylinder pressure on the basis of the detection results of the right master pressure sensor 48 FR and the left master pressure sensor 48FL.

One end of a hydraulic pressure supply and exhaust pipe 28 is connected to the reservoir tank 26. An inlet port of a pump 34 driven by a motor 32 is connected to the other end of the hydraulic pressure supply and exhaust pipe 28. An outlet port of the pump 34 is connected to a high pressure pipe 30. An accumulator 50 and a relief valve 53 are connected to the high pressure pipe 30. In the first embodiment, the pump 34 is a reciprocating pump including two or more pistons (not shown) each reciprocated by the motor 32. Adopted as the accumulator 50 is an accumulator that converts the pressure energy of brake fluid into the pressure energy of filler gas such as nitrogen.

The accumulator 50 accumulates brake fluid whose pressure is elevated by the pump 34 to about, for example, 14 to 22 MPa. The valve outlet of the relief valve 53 is connected to the fluid pressure supply and exhaust pipe 28. When the pressure of brake fluid in the accumulator 50 rises abnormally to reach, for example, about 25 MPa, the relief valve 53 opens, and the high pressure brake fluid is returned to the fluid pressure supply and exhaust pipe 28. Further, the high pressure pipe 30 is provided with an accumulator pressure sensor 51 that detects the outlet pressure of the accumulator 50, that is, the pressure of brake fluid in the accumulator 50.

The high pressure pipe 30 is connected to the right-front-wheel cylinder 20FR, the left-front-wheel cylinder 20FL, a right-rear-wheel cylinder 20RR, and a left-rear-wheel cylinder 20RL (hereinafter, these will be generically referred as "wheel cylinders 20" as required) via a right-front-wheel pressure increasing valve 40FR, a left-front-wheel pressure increasing valve 40FL, a right-rear-wheel pressure increasing valve 40RR, and a left-rear-wheel pressure increasing valve 40RL (hereinafter, these will be generically referred to as "pressure increasing valves 40" as required), respectively. Each of the pressure increasing valves 40 is a so-called normally closed linear valve (electromagnetic valve), which is closed when supplied with no electric current so as not to increase the wheel cylinder pressure, and opens upon supply of electric current so as to increase the wheel cylinder pressure.

The right-front-wheel cylinder 20FR, the left-front-wheel cylinder 20FL, the right-rear-wheel cylinder 20RR, and the left-rear-wheel cylinder 20RL are connected to a right-front-wheel pressure reducing valve 42FR, a left-front-wheel pressure reducing valve 42FL, a right-rear-wheel pressure reducing valve 42RR, and a left-rear-wheel pressure reducing valve 42RL (hereinafter, these will be generically referred to as "pressure reducing valves 42" as required), respectively.

The right-front-wheel pressure reducing valve 42FR and the left-front-wheel pressure reducing valve 42FL are each a so-called normally closed linear valve (electromagnetic valve), which is closed when supplied with no electric current so as not to reduce the wheel cylinder pressure, and opens upon supply of electric current so as to reduce the wheel cylinder pressure. On the other hand, the left-rear-wheel pressure reducing valve 42RL and the right-rear-wheel pressure reducing valve 42RR are each a so-called normally open linear valve (electromagnetic valve), which is closed when supplied with electric current so as not to reduce the wheel cylinder pressure, and opens when supply of electric current is reduced or stopped so as to reduce the wheel cylinder pressure.

In the hydraulic pipes in the vicinity of the right-front-wheel cylinder 20FR, the left-front-wheel cylinder 20FL, the right-rear-wheel cylinder 20RR, and the left-rear-wheel cylinder 20RL, there are respectively provided a right-front-wheel cylinder pressure sensor 44FR, a left-front-wheel cylinder pressure sensor 44FL, a right-rear-wheel cylinder pressure sensor 44RR, and a left-rear-wheel cylinder pressure sensor 44RL (hereinafter, these will be generically referred to as "wheel cylinder pressure sensors 44" as required), which respectively detect the fluid pressures of the corresponding wheel cylinders 20.

A hydraulic actuator 80 is formed by the master valves 22, the pressure increasing valves 40, the pressure reducing valves 42, the pump 34, the accumulator 50, the master pressure sensors 48, the wheel cylinder pressure sensors 44, the accumulator pressure sensor 51, and the like. The actuation of the actuator 80 is controlled by the ECU 100.

Figure 2:
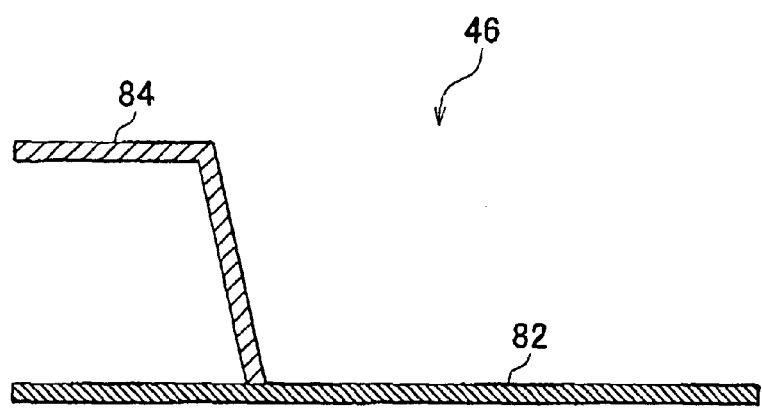
FIG. 2 is a view showing the configuration of a part of a stroke sensor according to the first embodiment.

FIG. 2 is a view showing the configuration of a part of the stroke sensor 46 according to the first embodiment. The stroke sensor 46 is a sliding type stroke sensor, and has a resistor 82 and a brush 84. The brush 84 is fixed to the brake pedal 12, and the brush 84 slides on the resistor 82 by a distance corresponding to the stroke of the brake pedal 12.

Figure 3:
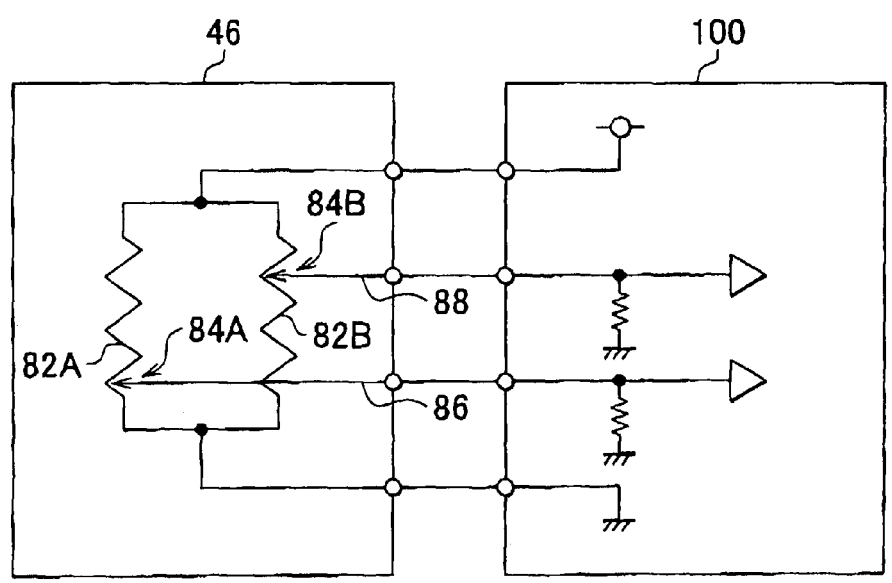
FIG. 3 is a circuit diagram of the stroke sensor according to the first embodiment.

FIG. 3 is a circuit diagram of the stroke sensor 46 according to the first embodiment. The stroke sensor 46 has two resistors 82 and two brushes 84. In the following description, these two resistors 82 and two brushes 84 will be referred to as a first resistor 82A, a second resistor 82B, a first brush 84A, and a second brush 84B.

The first resistor 82A and the second resistor 82B are arranged in parallel, with a predetermined voltage applied across the opposite ends thereof. The first brush 84A slides on the first resistor 82A as the brake pedal 12 pivots, and the second brush 84B slides on the second resistor 82B as the brake pedal 12 pivots. The first brush 84A and the second brush 84B are connected to the ECU 100, and are each grounded via a resistor. In this way, a voltage corresponding to the stroke of the brake pedal 12 is produced between the contact point of the first brush 84A with the first resistor 82A, and the ground contact point inside the ECU 100. This voltage is set as a first voltage V1, and the above-mentioned arrangement that produces the first voltage V1 is set as a first voltage detecting section 86. Further, a voltage corresponding to the stroke of the brake pedal 12 is also produced between the contact point between the second 84B with the second resistor 82B, and the ground contact point inside the ECU 100. This voltage is set as a second voltage V2, and the above-mentioned arrangement that produces the second voltage V2 is set as a second voltage detecting section 88.

Figure 4:
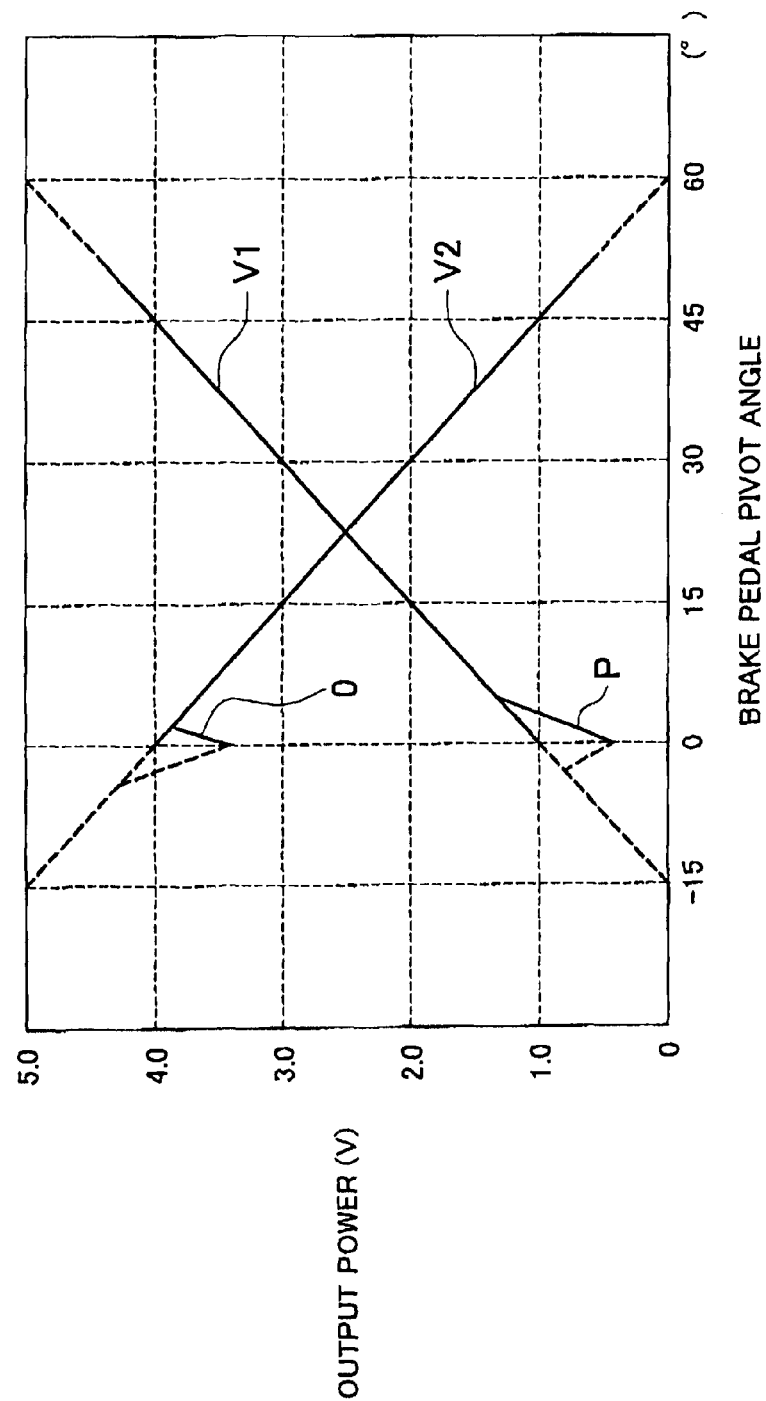
FIG. 4 is a diagram showing the relationship between the pivot angle of a brake pedal, and each of a first voltage and a second voltage.

FIG. 4 is a diagram showing the relationship between the pivot angle of the brake pedal 12, and each of the first voltage V1 and the second voltage V2. As shown in FIG. 4, the first voltage V1 increases linearly as the pivot angle of the brake pedal 12, that is, the stroke increases. The second voltage V2 decreases linearly as the stroke of the brake pedal 12 increases. In the first embodiment, the following relationship holds: first voltage V1+second voltage V2=5 (V).

The ECU 100 monitors both the first voltage V1 and the second voltage V2 produced in the first voltage detecting section 86 and the second voltage detecting section 88, and acquires the stroke of the brake pedal, 12 by using both the voltage values. If an abnormality has occurred in either the first voltage detecting section 86 or the second voltage detecting section 88, the ECU 100 acquires the stroke of the brake pedal 12 by employing the voltage value of one of the voltage detecting sections which is operating normally. Acquiring two electrical characteristics that vary in accordance with the stroke of the brake pedal 12 in this way makes it possible to detect the stroke of the brake pedal 12 even when a problem occurs in one of the electrical characteristics.

However, since the first brush 84A slides on the first resistor 82A, abrasion dust due to abrasion between the two components is produced as the brake pedal 12 is repeatedly depressed. The same is true for the second brush 84B and the second resistor 82B. If abrasion dust deposits between the first brush 84A and the first resistor 82A, or between the second brush 84B and the second resistor 82B, the relationship between the stroke and the first voltage V1, or the relationship between the stroke and the second voltage V2 changes.

The brake pedal 12 can pivot between a stroke start end which is a position where the stroke is 0°, and a stroke finish end which is the position of the brake pedal 12 when depressed to the maximum stroke. Thus, as the brake pedal 12 is repeatedly depressed, abrasion dust tends to accumulate at the distal end positions of the first brush 84A and second brush 84B at the time when the brake pedal 12 is at the stroke start end, and at the distal end positions of the first brush 84A and second brush 84B at the time when the brake pedal 12 is at the stroke finish end. However, since the brake pedal 12 is more frequently positioned at the stroke start end than at the stroke finish end, normally, more abrasion dust tends to accumulate at the distal end positions of the first brush 84A and second brush 84B at the time when the brake pedal 12 is at the stroke start end.

For instance, as abrasion dust accumulates at the distal end position of the first brush 84A at the time when the brake pedal 12 is positioned at the stroke start end, as indicated by P in FIG. 4, the first voltage V1 drops in the vicinity of the region where the pivot angle of the brake pedal 12 is 0°. Further, as abrasion dust accumulates at the distal end position of the second brush 84B at the time when the brake pedal 12 is positioned at the stroke start end, as indicated by Q in FIG. 4, the second voltage V2 decreases in the vicinity of the region where the pivot angle of the brake pedal 12 is 0°.

The ECU 100 constantly monitors the first voltage V1 and the second voltage V2 while the ignition switch (not shown) is turned on, and determines whether an abnormality has occurred in the stroke sensor 46 in consideration of the balance between the two voltages. Specifically, the ECU 100 determines that an abnormality has occurred in at least one of the first voltage V1 and the second voltage V2 if, for example, the sum of the first voltage V1 and the second voltage V2 drops below a predetermined voltage. Upon determining that an abnormality has occurred in at least one of the first voltage V1 and the second voltage V2 and that an accurate stroke cannot be acquired from the detection value of the stroke sensor 46, the ECU 100 cancels normal-condition brake control that is normally carried out, and carries out abnormal-condition brake control in which the master valves 22 are opened to directly transmit the master cylinder pressure to the right-front-wheel cylinder 20FR and the left-front-wheel cylinder 20FL. On the other hand, in a case where abrasion dust accumulates at the brush position corresponding to the stroke start end and thus the values of the first voltage V1 and second voltage V2 become abnormal, the first voltage V1 and the second voltage V2 return to their normal values as the actual stroke increases. When the first voltage V1 and the second voltage V2 have returned to their normal values, the ECU 100 resumes the normal-condition brake control that has been canceled.

When the normal-condition brake control is carried out, the depression force applied to the brake pedal 12 by the driver is controlled by the stroke simulator 24, whereas when the abnormal-condition brake control is carried out, the depression force applied to the brake pedal 12 by the driver is directly transmitted to the right-front-wheel cylinder 20FR and the left-front-wheel cylinder 20FL via the master cylinder 14. Thus, if the normal-condition brake control and the abnormal-condition brake control are switched in the course of changing the stroke of the brake pedal 12, this also affects the depression force on the brake pedal 12, which may impair the brake feeling for the driver. On the other hand, when the brake pedal 12 is at the stroke start end, this means that the brake pedal 12 has not been depressed by the driver, so there is little need to cancel the normal-condition brake control even if an abnormality has occurred in the stroke sensor 46.

Thus, in the procedure of determining an abnormality in the stroke sensor 46 in the brake control device 10 according to the first embodiment, if it is determined that the brake pedal 12 is positioned near the stroke start end, a determination that an abnormality has occurred in the stroke sensor 46 is not made irrespective of the value of the first voltage V1 or the second voltage V2. Now, a detailed description will be given of the configuration of a stroke sensor abnormality determining device provided to carry out an abnormality determination for the stroke sensor 46, and an abnormality determination procedure for the stroke sensor 46, with reference to FIGS. 5 and 6.

Figure 5:
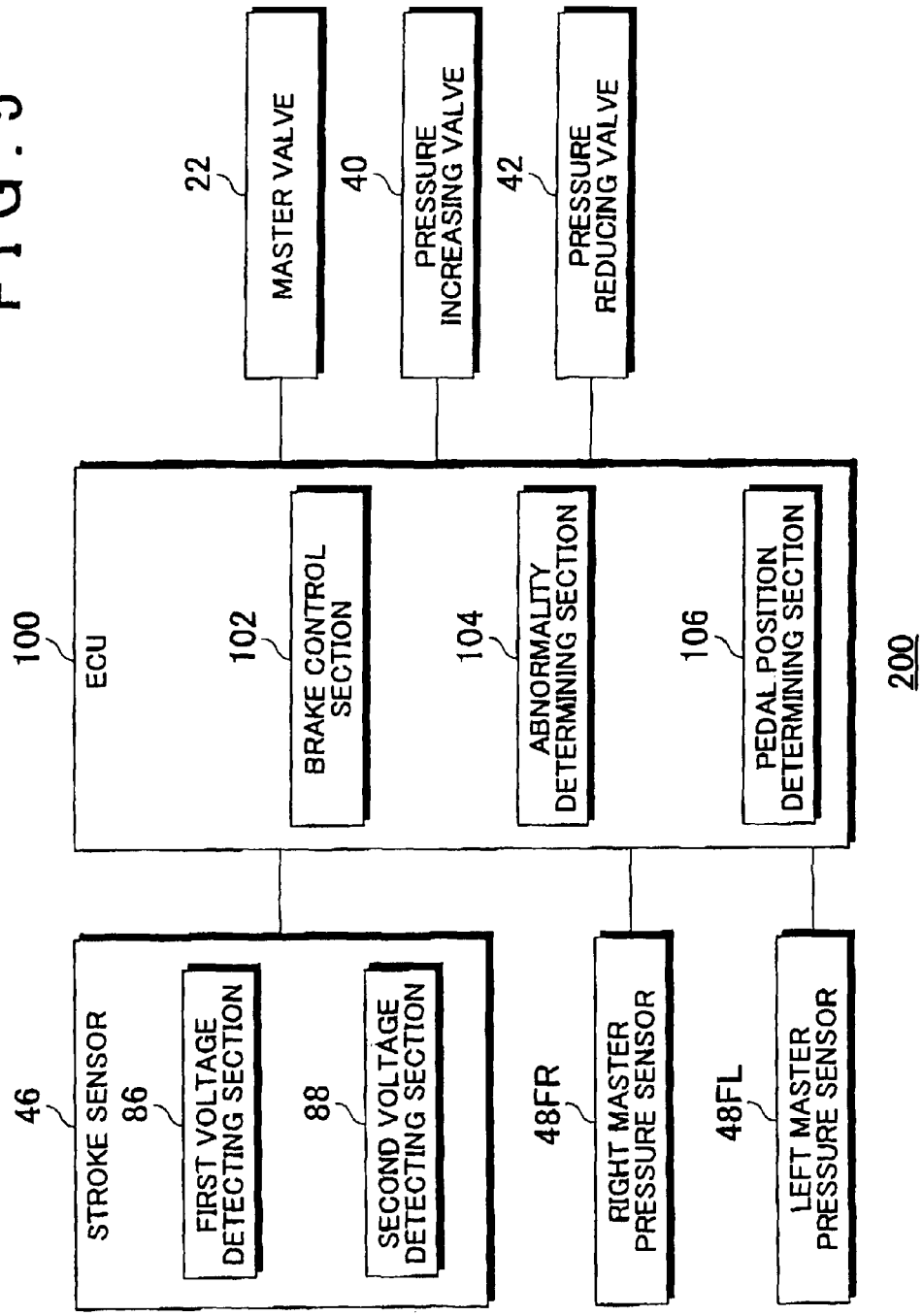
FIG. 5 is a functional block diagram showing the configuration of a stroke sensor abnormality determining device according to the first embodiment.

FIG. 5 is a functional block diagram showing the configuration of a stroke sensor abnormality determining device 200 according to the first embodiment. It should be noted that FIG. 5 depicts, as the ECU 100, functional blocks realized by cooperation between hardware, such as a CPU that executes various kinds of computation process, a ROM that stores various kinds of control program, and a RAM used as a work area for data storage or program execution, and software. Thus, these functional blocks can be realized in a variety of ways in accordance with the combination of hardware and software.

The stroke sensor abnormality determining device 200 has the stroke sensor 46, the right master pressure sensor 48FR, the left master pressure sensor 48FL, and the ECU 100. The ECU 100 has a brake control section 102, an abnormality determining section 104, and a pedal position determining section 106. The brake control section 102 controls the opening and closing of each of the master valves 22, the pressure increasing valves 40, and the pressure reducing valves 42. The abnormality determining section 104 determines whether an abnormality has occurred in the stroke sensor 46, by using the detection results of the first voltage detecting section 86 and second voltage detecting section 88 of the stroke sensor 46. The pedal position determining section 106 determines whether the brake pedal 12 is positioned near the stroke start end, by using the detection results from the right master pressure sensor 48FR and left master pressure sensor 48FL.

Figure 6:
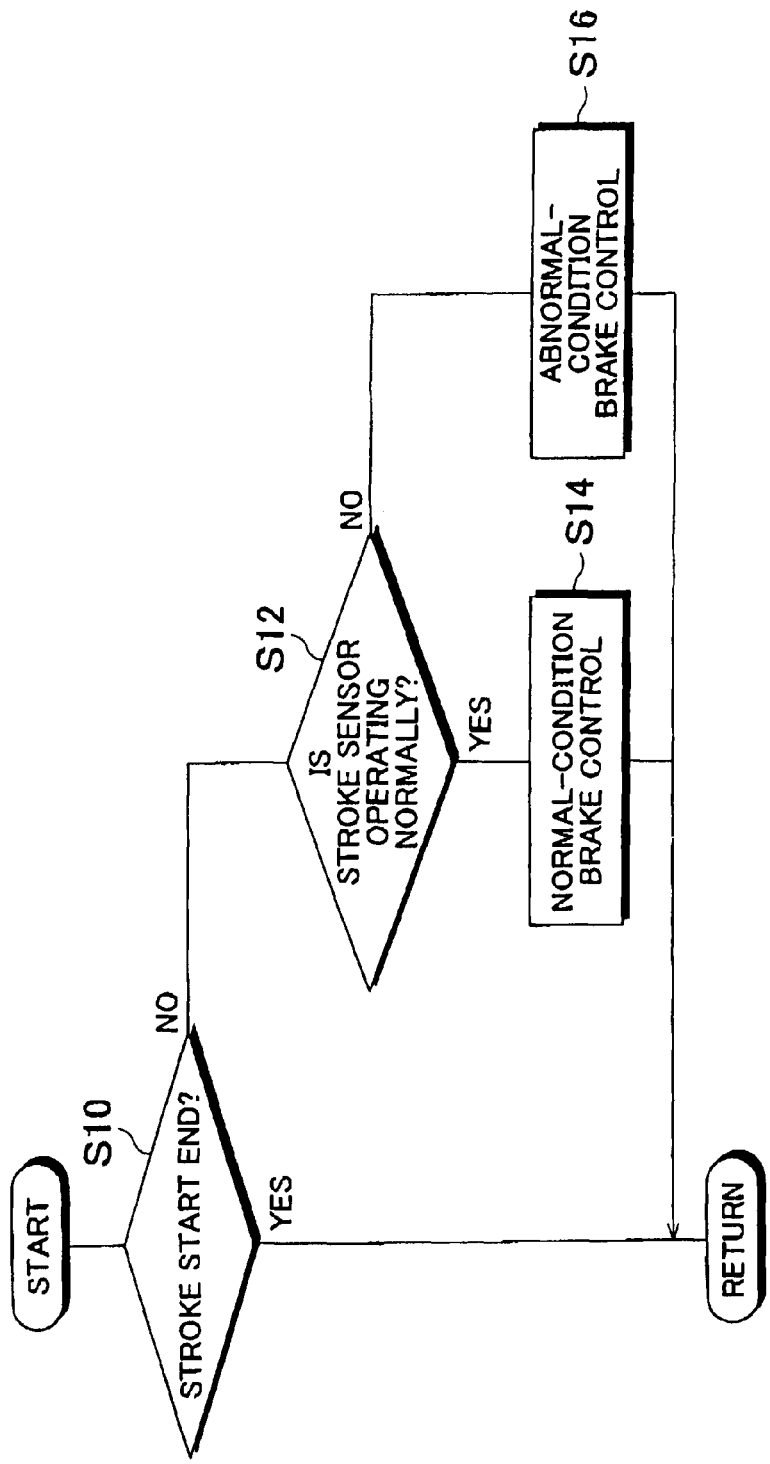
FIG. 6 is a flowchart showing an abnormality determination procedure for the stroke sensor performed by the stroke sensor abnormality determining device according to the first embodiment.

FIG. 6 is a flowchart showing an abnormality determination procedure for the stroke sensor 46 performed by the stroke sensor abnormality determining device 200 according to the first embodiment. The process shown in this flowchart is started when the ignition switch is turned on, and then repeatedly carried out until the ignition switch is turned off.

First, the pedal position determining section 106 determines whether the brake pedal 12 is positioned near the stroke start end, on the basis of the detection results of the right master pressure sensor 48FR and left master pressure sensor 48FL (S10).

For example, in a case where abrasion dust accumulates at the distal end position of the first brush 84A or the second brush 84B at the time when the brake pedal 12 is positioned near the stroke start end, there is a possibility that the detection result of the stroke sensor 46 is affected by the abrasion dust. Accordingly, if the detection result of the stroke sensor 46 (the first voltage detecting section 86 and the second voltage detecting section 88) is used to determine whether the brake pedal 12 is positioned near the stroke start end, this may render correct determination difficult. For this reason, in the stroke sensor abnormality determining device 200 according to the first embodiment, whether the brake pedal 12 is positioned near the stroke start end is determined on the basis of the detection results of the right master pressure sensor 48FR and the left master pressure sensor 48FL.

Specifically, the pedal position determining section 106 determines that the brake pedal 12 is positioned near the stroke start end which is the position of the brake pedal 12 where the abnormality determination for the stroke sensor 46 should be cancelled, if both the following equations have been continuously satisfied for a predetermined period of time (96 msec in the first embodiment):

Right-front-wheel master cylinder pressure
$Pmc\_fr \leq 0.075$ (MPa); and

Left-front-wheel master cylinder pressure
$Pmc\_fl \leq 0.075$ (MPa).

If the brake pedal 12 is positioned near the stroke start end (YES of S10), the brake control section 102 temporarily terminates the process according to this flowchart without making a determination as to whether an abnormality has occurred in the stroke sensor 46, and without carrying out the normal-condition brake control or the abnormal-condition brake control. In this way, when the brake pedal 12 is near the stroke start end, an abnormality determination for the stroke sensor 46 is not carried out, and a determination that an abnormality has occurred in the stroke sensor 46 is not made. Thus, the frequency with which the brake control switches from the abnormal-condition brake control to the normal-condition brake control in the course of changing the stroke of the brake pedal 12 can be reduced. Therefore, it is possible to prevent a decrease in brake feeling for the driver.

If the brake pedal 12 is not positioned near the stroke start end (NO of S10), the abnormality determining section 104 determines whether an abnormality has occurred in the stroke sensor 46 by using the first voltage V1 and the second voltage V2 that have been detected (S12). If it is determined that the stroke sensor 46 is operating normally (YES of S12), the brake control section 102 carries out the normal-condition brake control (S14). If it is determined that an abnormality has occurred in the stroke sensor 46 (NO of S12), the brake control section 102 carries out the abnormal-condition brake control (S16).

In the normal-condition brake control, first, in a state with the master valves 22 closed, the brake control section 102 computes target wheel cylinder pressures for the respective wheel cylinders 20 on the basis of the stroke of the brake pedal 12 detected by the stroke sensor 46 and master cylinder pressures detected by the master pressure sensors 48. The brake control section 102 controls the opening and closing of the respective pressure increasing valves 40 and pressure decreasing valves 42 so that the wheel cylinder pressures of the respective wheel cylinders 20 become the target wheel cylinder pressures. Since such normal-condition brake control is known in the art, further detailed description on the normal-condition brake control is omitted.

In the abnormal-condition brake control, the brake control section 102 suspends the control of the wheel cylinder pressures of the respective wheel cylinder 20 by the pressure increasing valves 40 and the pressure reducing valves 42, and opens the master valves 22 to directly transmit the master cylinder pressure of the master cylinder 14 to the right-front-wheel cylinder 20FR and the right-front-wheel cylinder 20FL. Since such abnormal-condition brake control is known in the art, detailed description thereof is omitted. By carrying out such abnormal-condition brake control if it is determined that an abnormality has occurred in the stroke sensor 46, it is possible to avoid a situation where the wheel cylinder pressure is controlled on the basis of the detection result of the stroke sensor 46 in which an abnormality has occurred.

Second Embodiment

Unless otherwise stated in the following description, the configuration and operation of a stroke sensor abnormality determining device 200 according to a second embodiment of the present invention are the same as those of the first embodiment. In the stroke sensor abnormality determining device 200 according to the second embodiment, the pedal position determining section 106 determines whether the brake pedal 12 is positioned near the stroke start end by using also the first voltage V1 detected by the stroke sensor 46. Specifically, in S10 of FIG. 6, the pedal position determining section 106 according to the second embodiment determines that the brake pedal 12 is positioned near the stroke start end, if the following three equations have been continuously satisfied for a predetermined period of time (96 msec in the second embodiment):

Right-front-wheel master cylinder pressure
$Pmc\_fr \leq 0.075$ (MP);

Left-front-wheel master cylinder pressure
$Pmc\_fl \leq 0.075$ (MPa); and

Pivot angle of the brake pedal based on the stroke of the stroke sensor $46 < 0.9$ (deg).

It should be noted that in the above-mentioned equations, the pivot angle of the brake pedal based on the stroke of the stroke sensor 46 is computed by subtracting a first reference voltage Vs1, which is the value of the first voltage V1 at the stroke start end, from the value of the first voltage V1. The master cylinder pressure does not vary greatly near the stroke start end even when the brake pedal 12 is depressed. In contrast, the first voltage V1 varies stably in accordance with the stroke even near the stroke start end. In this way, by determining whether the brake pedal 12 is positioned near the stroke start end in consideration of the first voltage V1 also, the position of the brake pedal 12 can be accurately grasped in the vicinity of the stroke start end.

Next, the reason why not the second voltage V2 but the first voltage V1 is used in determining whether the brake pedal 12 is positioned near the stroke start end will be described with reference to FIGS. 7A and 7B.

Figure 7A:
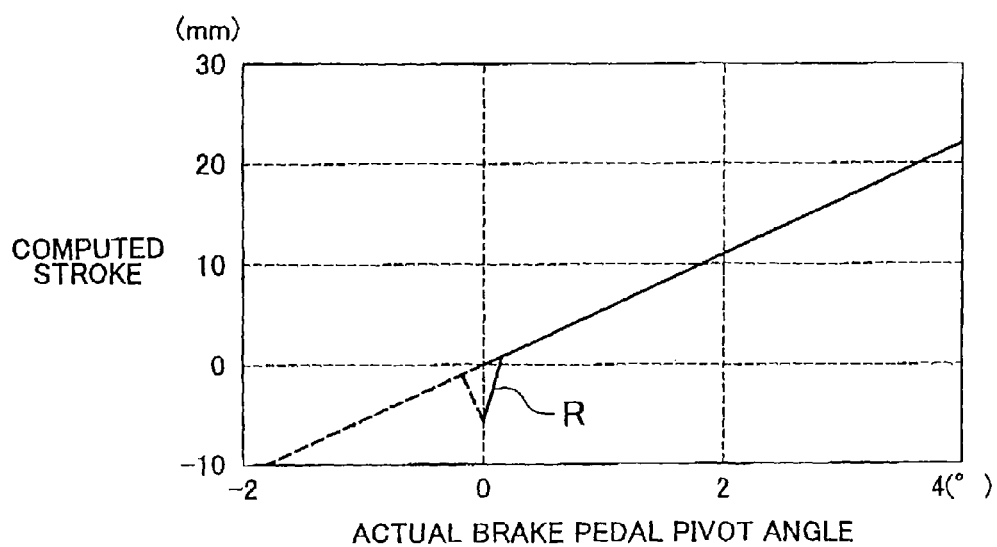
FIG. 7A is a diagram showing the relationship between the actual pivot angle of the brake pedal, and the stroke computed on the basis of the first voltage.

FIG. 7A is a diagram showing the relationship between the actual pivot angle of the brake pedal 12, and the stroke computed on the basis of the first voltage V1. FIG. 7B is a diagram showing the relationship between the actual pivot angle of the brake pedal 12, and the stroke computed on the basis of the second voltage V2.

Figure 7B:
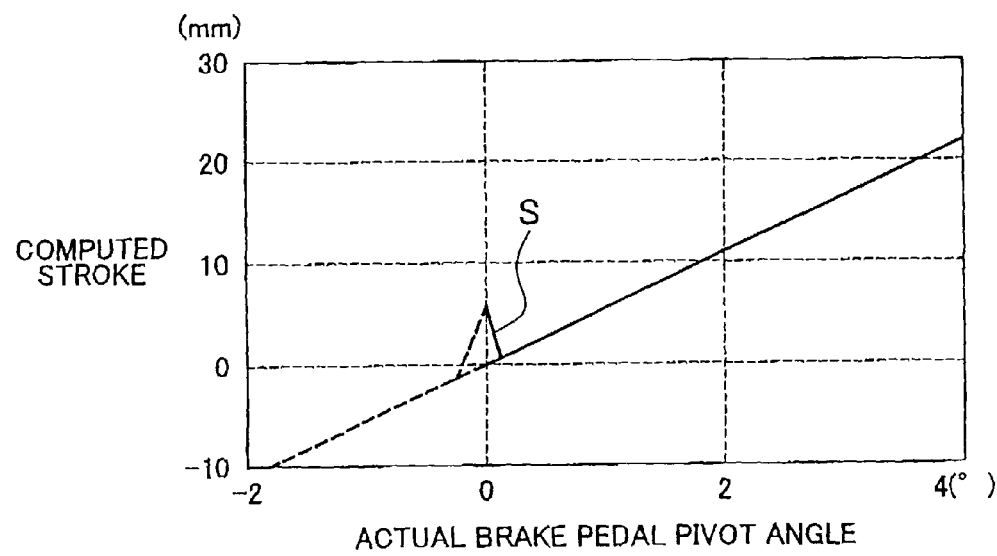
FIG. 7B is a diagram showing the relationship between the actual pivot angle of the brake pedal, and the stroke computed on the basis of the second voltage.

If abrasion dust accumulates at the position of the second brush 84B at the time when the brake pedal 12 is positioned at the stroke start end, as shown in FIG. 7B, the stroke computed on the basis of the second voltage V2 becomes a high value in the vicinity of the stroke start end. Thus, for example, provided that the brake pedal 12 is determined to be positioned near the stroke start end if the pivot angle of the stroke sensor 46 computed on the basis of the second voltage V2 is smaller than a predetermined angle (for example, 0.9 deg) as in the above-mentioned equation, there is a possibility that the stroke computed on the basis of the second voltage V2 already exceeds the predetermined angle at the stroke start end. Accordingly, a situation may arise in which although it is necessary to cancel the abnormality determination for the stroke sensor 46, the abnormality determination cannot be cancelled.

In contrast, if abrasion dust accumulates at the position of the first brush 84A at the time when the brake pedal 12 is positioned at the stroke start end, as shown in FIG. 7A, the stroke computed on the basis of the first voltage V1 becomes a small value in the vicinity of the stroke start end. Thus, there is a low possibility that the pivot angle of the stroke sensor 46 computed on the basis of the first voltage V1 already exceeds the predetermined angle at the stroke start end. In this way, by determining whether the brake pedal 12 is positioned near the stroke start end by using the first voltage V1, it is possible to cancel an abnormality determination for the stroke sensor 46 in an appropriate manner.

The present invention is not limited to the embodiments described above, but any suitable combination of the features of the embodiments is also effective as an embodiment of the present invention. Further, those skilled in the art can make various modifications such as design changes to the embodiments on the basis of their knowledge, and such modified embodiments also fall within the scope of the present invention. In the following, such cases will be described.

According to a modified embodiment, the pedal position determining section 106 determines whether the brake pedal 12 is positioned near the stroke finish end. If it is determined that the brake pedal 12 is positioned near the stroke finish end, the abnormality determining section 104 does not make a determination that an abnormality has occurred in the brake pedal 12 irrespective of the value of the first voltage V1 or the second voltage V2. There is a possibility that abrasion dust also accumulates at the positions of the first brush 84A and second brush 84B at the time when the brake pedal 12 is positioned at the stroke finish end. Accordingly, in this way, an abnormality determination for the stroke sensor 46 is not carried out if the brake pedal 12 is positioned near the stroke finish end, thereby making it possible to suppress the influence of abrasion dust on the abnormality determination for the stroke sensor 46.

According to a modified embodiment, S10 and S12 in FIG. 6 change places. That is, first, the abnormality determining section 104 provisionally determines whether an abnormality has occurred in the stroke sensor 46, and if it is determined that an abnormality has occurred in the stroke sensor 46, it is determined whether the brake pedal 12 is positioned near the stroke start end. When it is determined that the brake pedal 12 is positioned near the stroke start end, even if it has been provisionally determined that an abnormality has occurred in the stroke sensor 46, this determination is cancelled, and an abnormality is not determined to have occurred in the stroke sensor 46. In this case, the brake control section 102 carries out neither the normal-condition brake control nor the abnormal-condition brake control. If it is determined that the brake pedal 12 is not positioned near the stroke start end, the abnormality determining section 104 definitively determines that an abnormality has occurred in the stroke sensor 46. In this case, the brake control section 102 carries out the abnormal-condition brake control. In this way, by rearranging the determination procedure of the flowchart shown in FIG. 6, it is possible to reduce the frequency of determining whether the brake pedal 12 is positioned near the stroke start end.

The invention claimed is:

1. A stroke sensor abnormality determining method comprising:
   detecting an electrical characteristic that varies in accordance with a stroke of a brake pedal;
   determining whether an abnormality has occurred in the stroke sensor on the basis of the detected electrical characteristic; and
   determining whether a brake pedal is positioned near a stroke end of the brake pedal,
   wherein if it is determined that the brake pedal is positioned near the stroke end, it is not determined that an abnormality has occurred in the stroke sensor.

2. A brake control method comprising:
   detecting an electrical characteristic that varies in accordance with a stroke of a brake pedal;
   determining whether an abnormality has occurred in the stroke sensor on the basis of the detected electrical characteristic; and
   determining whether a brake pedal is positioned near a stroke end of the brake pedal,
   wherein even if it has been determined that an abnormality has occurred in the stroke sensor, when it is determined that the brake pedal is positioned near the stroke end of the brake pedal, abnormal-condition brake control is not carried out.

3. A stroke sensor abnormality determining device comprising:
   a stroke sensor that detects a stroke of a brake pedal by detecting an electrical characteristic that varies in accordance with a stroke of the brake pedal;
   an abnormality determining device that determines whether an abnormality has occurred in the stroke sensor on the basis of the detected electrical characteristic; and a pedal position determining device that determines whether the brake pedal is positioned near a stroke end of the brake pedal, wherein the abnormality determining device does not determine that an abnormality has occurred in the stroke sensor, if it is determined that the brake pedal is positioned near the stroke end.

4. The stroke sensor abnormality determining device according to claim 3, wherein:
the pedal position determining device determines whether the brake pedal is positioned near a stroke start end at which the brake pedal is positioned when not depressed; and
the abnormality determining device does not determine that an abnormality has occurred in the stroke sensor, if it is determined that the brake pedal is positioned near the stroke start end.

5. The stroke sensor abnormality determining device according to claim 3, further comprising:
a master cylinder pressure detecting device that detects a master cylinder pressure,
wherein the pedal position determining device determines whether the brake pedal is positioned near the stroke end by using the detected master cylinder pressure.

6. The stroke sensor abnormality determining device according to claim 5, wherein:
the pedal position determining device determines that the brake pedal is positioned near the stroke end, if the detected master cylinder pressure is equal to or lower than a predetermined value.

7. The stroke sensor abnormality determining device according to claim 3, wherein:
the pedal position determining device determines whether the brake pedal is positioned near the stroke end on the basis of the detected electrical characteristic.

8. The stroke sensor abnormality determining device according to claim 7, wherein:
the stroke sensor detects a first voltage that increases as a stroke of the brake pedal increases; and
the pedal position determining device determines that the brake pedal is positioned near the stroke end, if a stroke computed by using the first voltage detected by the stroke sensor is smaller than a predetermined value.

9. The stroke sensor abnormality determining device according to claim 8, wherein:
the stroke sensor includes a brush that moves together with the brake pedal, and a resistor; and
the brush slides against the resistor when the brush moves.

10. The stroke sensor abnormality determining device according to claim 8, wherein:
the stroke sensor detects a second voltage that decreases as a stroke of the brake pedal increases.

11. The stroke sensor abnormality determining device according to claim 3, wherein:
if it is determined that the brake pedal is positioned near the stroke end, the abnormality determining device does not determine whether an abnormality has occurred in the stroke sensor.

12. The stroke sensor abnormality determining device according to claim 3, wherein:
even if the abnormality determining device has made a provisional determination that an abnormality has occurred in the stroke sensor, when the pedal position determining device determines that the brake pedal is positioned near the stroke end, the abnormality determining device cancels the provisional determination.

13. A brake control device comprising:
a stroke sensor that detects a stroke of a brake pedal by detecting an electrical characteristic that varies in accordance with a stroke of the brake pedal;
a pedal position determining device that determines whether the brake pedal is positioned near a stroke end of the brake pedal; and
a controller that carries out abnormal-condition brake control when an abnormality has occurred in the stroke sensor,
wherein the controller does not carry out the abnormal-condition brake control if it is determined that the brake pedal is positioned near the stroke end.

14. The brake control device according to claim 13, further comprising:
an abnormality determining device that determines whether an abnormality has occurred in the stroke sensor on the basis of the detected electrical characteristic,
wherein even if the abnormality determining device has determined that an abnormality has occurred in the stroke sensor, when the pedal position determining device determines that the brake pedal is positioned near the stroke end, the controller does not carry out the abnormal-condition brake control.

* * * * *